July 31, 1962 — E. R. THOMSEN — 3,047,290
ENVELOPE AND SHEET FEEDER AND COLLATING APPARATUS
Filed Dec. 8, 1960 — 9 Sheets-Sheet 1

INVENTOR
Elmer R. Thomsen
BY John A. Mawhinney
ATTORNEY

July 31, 1962  E. R. THOMSEN  3,047,290
ENVELOPE AND SHEET FEEDER AND COLLATING APPARATUS
Filed Dec. 8, 1960  9 Sheets-Sheet 2

INVENTOR
Elmer R. Thomsen
BY John A. Mawhinney
ATTORNEY

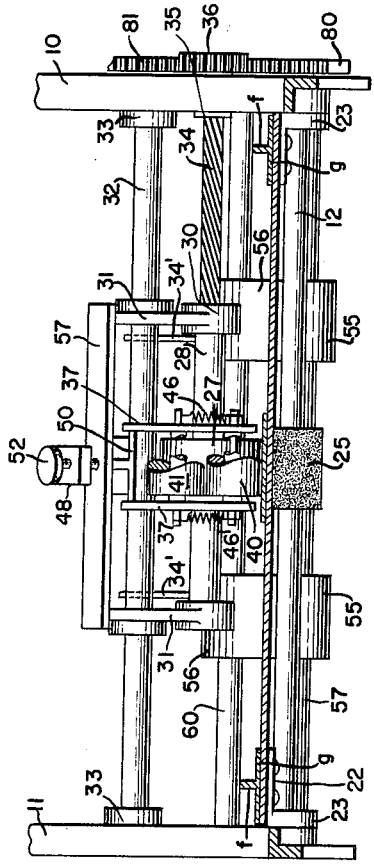
July 31, 1962  E. R. THOMSEN  3,047,290
ENVELOPE AND SHEET FEEDER AND COLLATING APPARATUS
Filed Dec. 8, 1960  9 Sheets-Sheet 3
INVENTOR
Elmer R. Thomsen
BY John A. Mawhinney
ATTORNEY July 31, 1962 E. R. THOMSEN 3,047,290
ENVELOPE AND SHEET FEEDER AND COLLATING APPARATUS
Filed Dec. 8, 1960 9 Sheets-Sheet 4
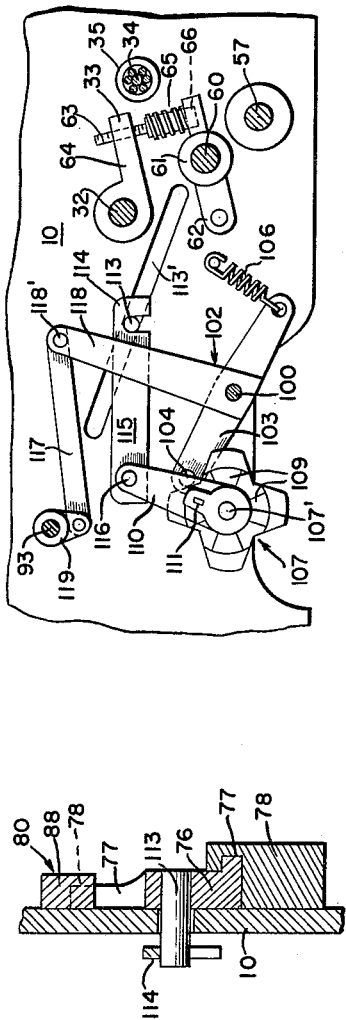
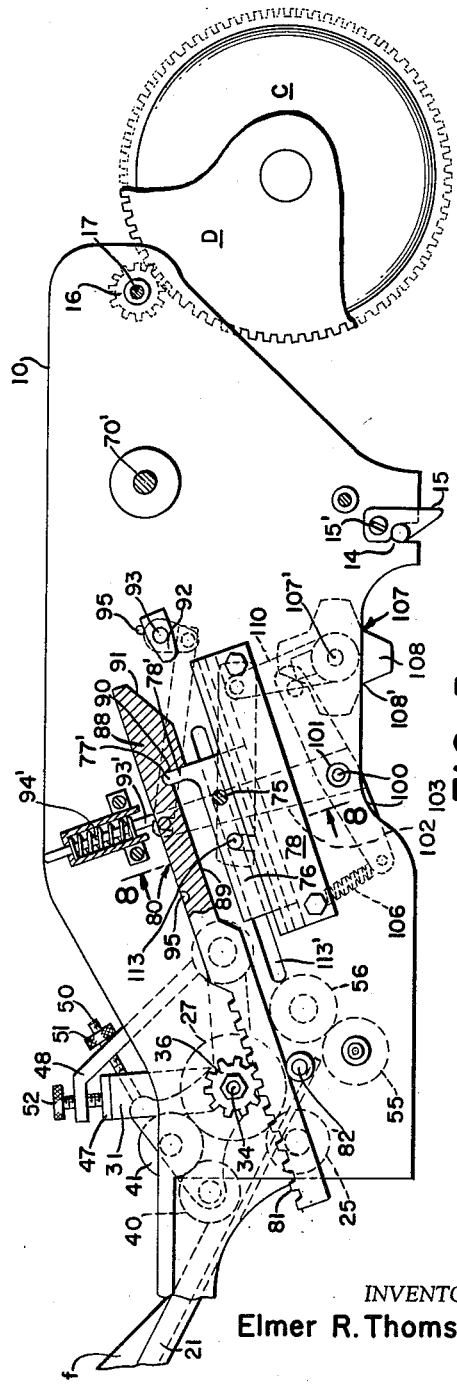
INVENTOR
Elmer R. Thomsen
BY John A. Mawhinney
ATTORNEY

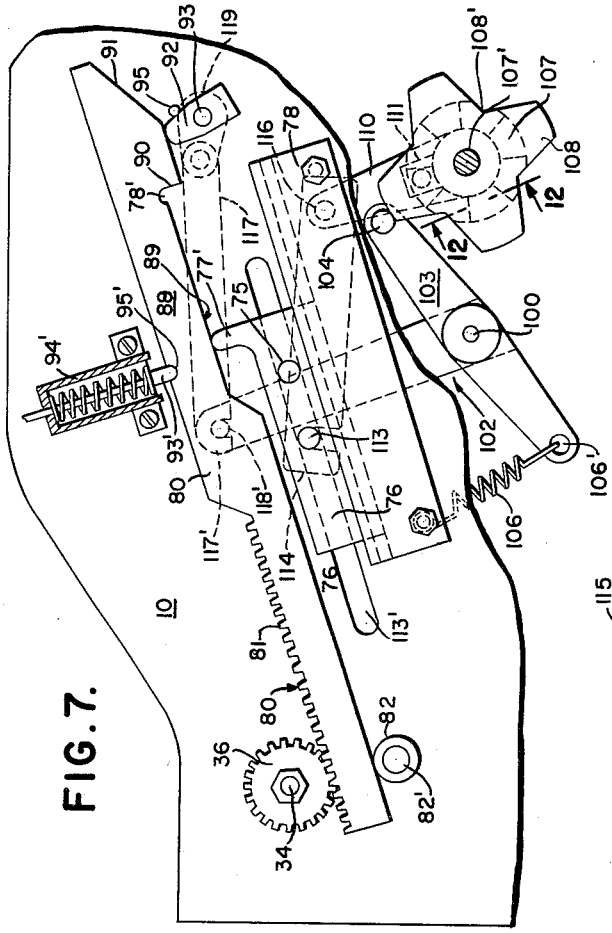

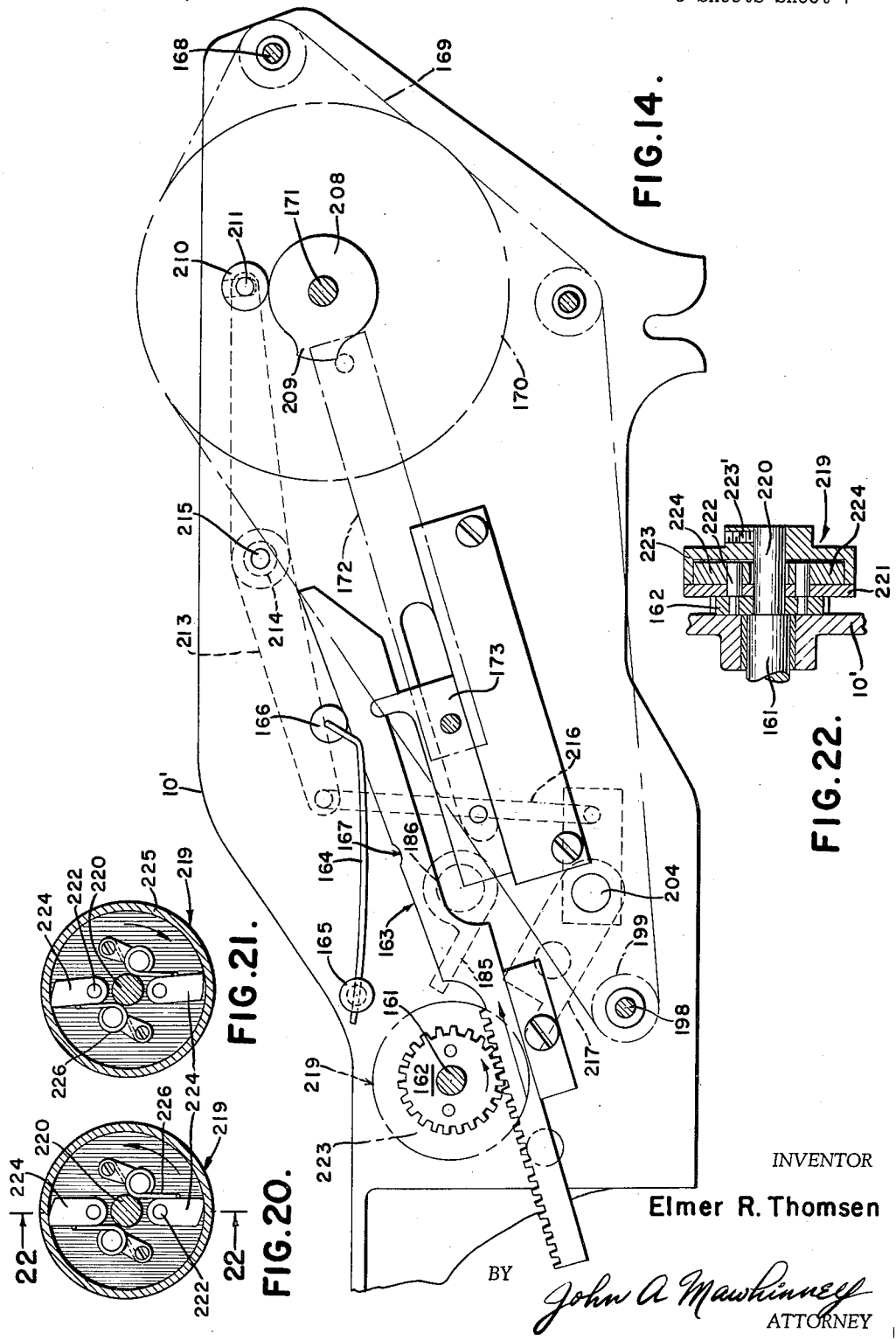

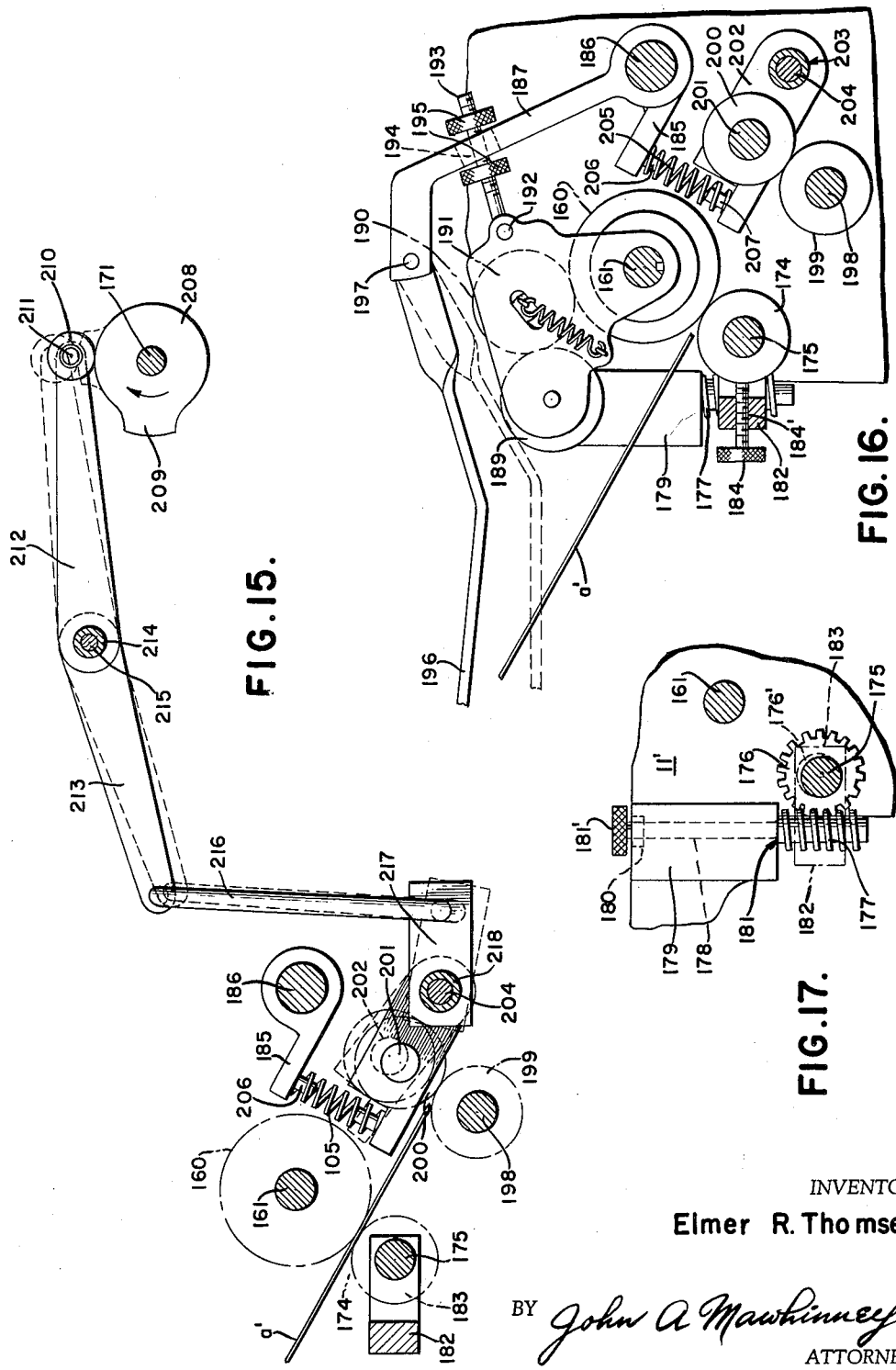

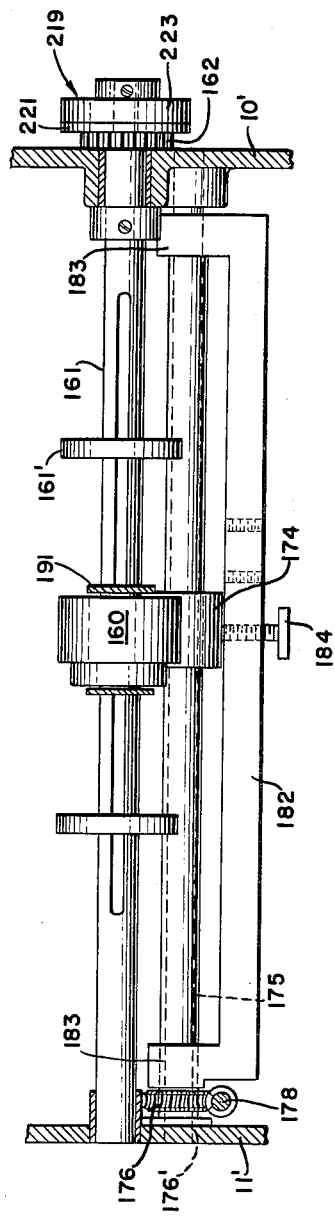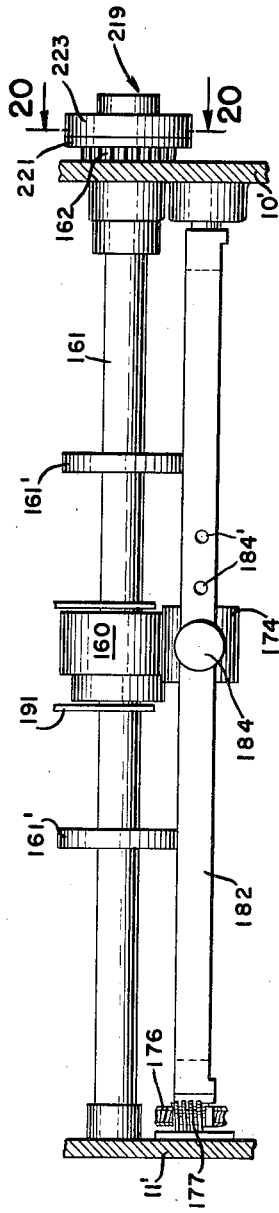

3,047,290
ENVELOPE AND SHEET FEEDER AND COLLATING APPARATUS
Elmer R. Thomsen, 11022 SE. Stephens St., Portland, Oreg.
Filed Dec. 8, 1960, Ser. No. 74,696
37 Claims. (Cl. 271—36)

This invention relates to a feeder and collating apparatus with which stock such as paper, envelopes and sheets, or any equivalent, are intermittently and frictionally forwarded directly to a printing cylinder such as that of a rotary offset duplicator press, for example.

The invention provides a novel apparatus of the character stated wherein the stock is most accurately started into the forwarding device at the same time in relation to the operation of the cylinder of the press.

A prime object is to provide a novel mechanism which assures the starting of the forwarding feed movement of the sheet always in relation to the correct operation of the press, through the engagement and disengagement of a power input slide and an actuating slide for the forwarding feed roll device, with said engagement and disengagement of the slides occurring in the most forward position of the slides.

It is sought to attain the result stated through the co-action of a novel rack member geared to the forwarding feed roll device and so constructed as to reciprocate as well as to periodically be inactive and to be cam-actuated for lateral controlling motion between the different positions in an operating cycle, the roll device always starting and stopping in the same position in relation to the operation of the printing or blanket cylinder.

Again, it is aimed to provide mechanism whereby the improved feeder apparatus may feed alternately with the feeder apparatus of the press, that is, feed one piece of stock during each revolution of the blanket cylinder and the press feed one piece of stock during each revolution as resulting in collating the different colored sheets as they are printed.

Still further, the invention provides novel means readily attachable to the press to effect the skipping of the alternate feed by its conventional feeder apparatus so that such conventional feeder apparatus will feed but one sheet or piece of stock during each revolution of the blanket cylinder of the press.

One more object is to provide the apparatus in different forms according to the degree of friction or positiveness desired for the feed of the stock particularly on the part of the pull-out rolls.

Another object is to provide the apparatus in one form wherein the stock is fed into the bight of contacting or closed pull-out rolls.

Still another object is to provide the apparatus in another form wherein the stock is received between the pull-out rolls while separated at the limit of feeding motion of the feed roll and thereafter are closed to grip the stock.

A further object is to provide, for instance in the latter form, means enabling minute adjustment of the stone or other stock separator relative to the periphery of the feed roll.

Various additional objects and advantages will in part be pointed out and otherwise become apparent from a consideration of the description following taken in connection with the accompanying drawings illustrating one operative embodiment by way of example.

In said drawings:

FIGURE 4 is a vertical cross-sectional view taken on the plane of line 4—4 of FIGURE 1;

FIGURE 5 is a view mainly in side elevation but partly in section taken along the plane of line 5—5 of FIGURE 1;

FIGURE 6 is a side elevation of most of the parts of FIGURE 5 on an enlarged scale with the slides of the actuating mechanism for the forwarding roll device in their foremost position;

FIGURE 7 is a view generally similar to FIGURE 6 showing the said slides in their rearmost position;

FIGURE 8 is a generally cross-sectional view taken on the plane of line 8—8 of FIGURE 5;

FIGURE 9 is a view showing the cam and ratchet mechanism partly in section and primarily in elevation, looking toward the inner face of one of the frame side plates, showing the parts of the skip mechanism employed for eliminating alternate stock-feeding operations by the conventional feeder of the press P;

FIGURE 10 is a cross-sectional view taken on the line 10—10 of FIGURE 6;

FIGURE 12 is a detail section taken on line 12—12 of FIGURE 7;

FIGURE 14 is an enlarged fragmentary and schematic elevation looking toward the lower side plate in FIGURE 13;

FIGURE 15 is a longitudinal sectional view detailing primarily the pull-out rolls and certain associated and actuating parts;

FIGURE 16 is a longitudinal section further detailing primarily the pull-out rolls and certain associated and actuating parts;

FIGURE 17 is a fragmentary sectional view looking toward the inner surface of one of the side plates and detailing the adjustable mounting for the separator stone;

FIGURE 18 is a detail view primarily in plan detailing the feed roll and separator stone and their mounting;

FIGURE 19 is a view primarily in side elevation of the parts of FIGURE 18;

FIGURE 20 is a detail sectional view taken through the clutch on the plane of line 20—20 of FIG. 13 with the pawls shown in clutching position;

FIGURE 21 is a view similar to FIGURE 20 with the pawls shown in slipping position; and FIGURE 22 is a detail longitudinal sectional view taken through the last-mentioned clutch.

Figures 1, 11:
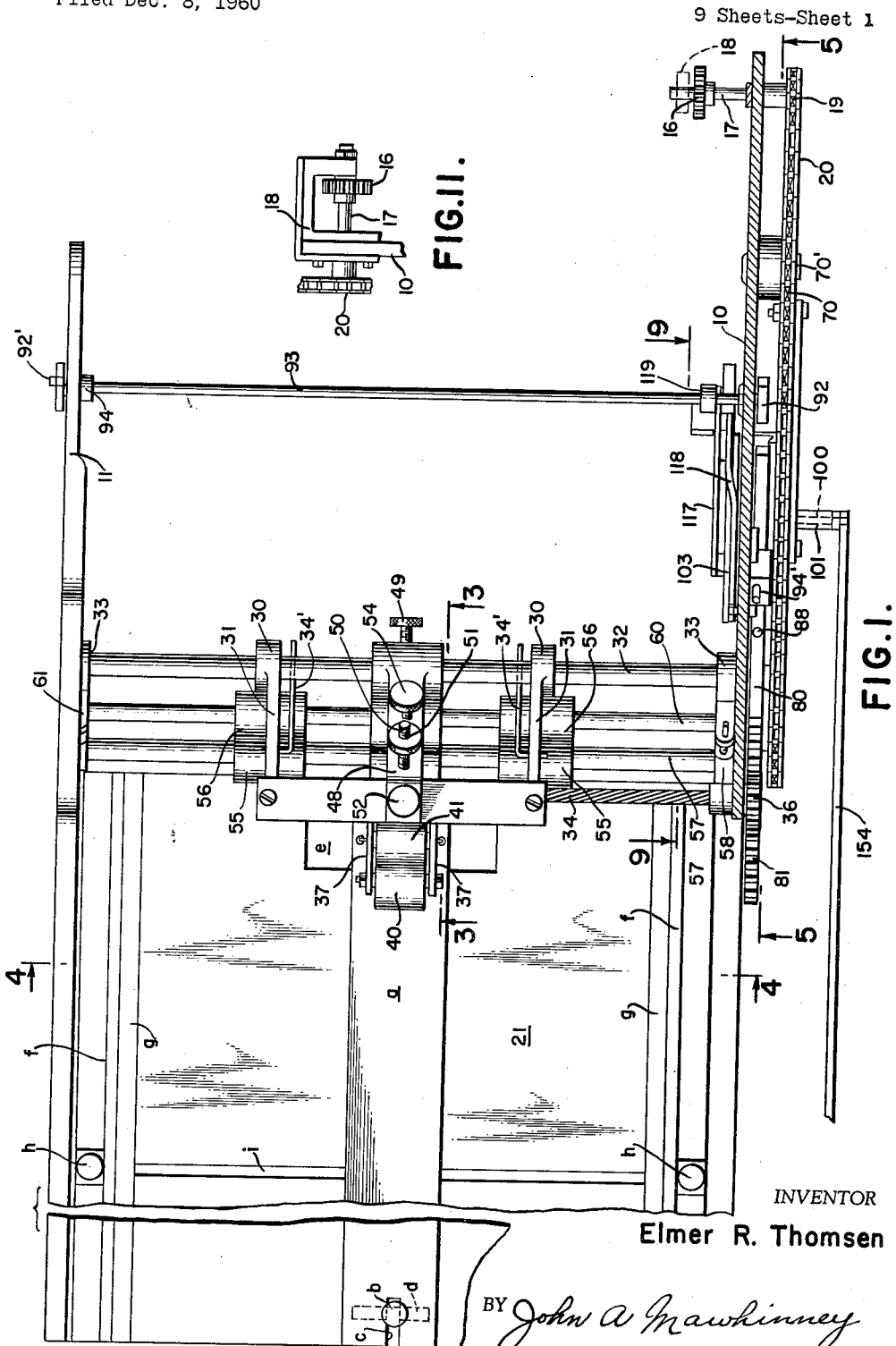
FIGURE 1 is a plan view of the improved feeder apparatus partially broken away to disclose details.
FIGURE 11 is a fragmentary front end detail showing the input drive.

In said drawings P represents fragmentarily a conventional offset printing duplicator or other press with which the improved feeder apparatus F constituting the present invention coacts. This feeder apparatus is designed to feed envelopes, sheets, or any suitable stock of paper or the equivalent, and where either of the words "envelope," "sheet" or "stock" is used hereinafter, it is to be taken in a generic sense. This apparatus F is suitably detachably mounted "piggy-back" on the frame of the press P to feed the stock to the press in lieu of the conventional feeder of that press, or selectively to cause the stock feeder mechanism of that press to skip alternate feeding movements of the stock and in place of such skipped feeding movements to itself feed stock to the press and thus alternately with such conventional feeder mechanism and with collation of the sheets during printing. Hereinafter referred to rods A and B, blanket cylinder C and its operating gear D, feeder arm G and its rock shaft H are parts of the press P.

Referring more specifically to the drawings wherein like reference characters designate like or similar parts throughout the different views, the instant feeder apparatus F comprises a rigid supporting body or frame including for instance two parallel side plates 10 and 11 rigidly connected together as by a central transverse rod 12, and by a transverse rod 13, the latter joining upwardly inclined terminal portions at the rear ends of said plates 10 and 11.

Said plates 10 and 11, for example, rest detachably on said transverse rods A and B, the plates being notched as at 14 (FIGURE 5) to engage rod A, and at least one of the side plates having a conventional hook or latch device 15 pivoted thereto at 15' operable to immovably but releasably secure the feeder apparatus F to press P and to thus maintain enmeshed, the operating gears to be referred to.

Figures 2, 3:
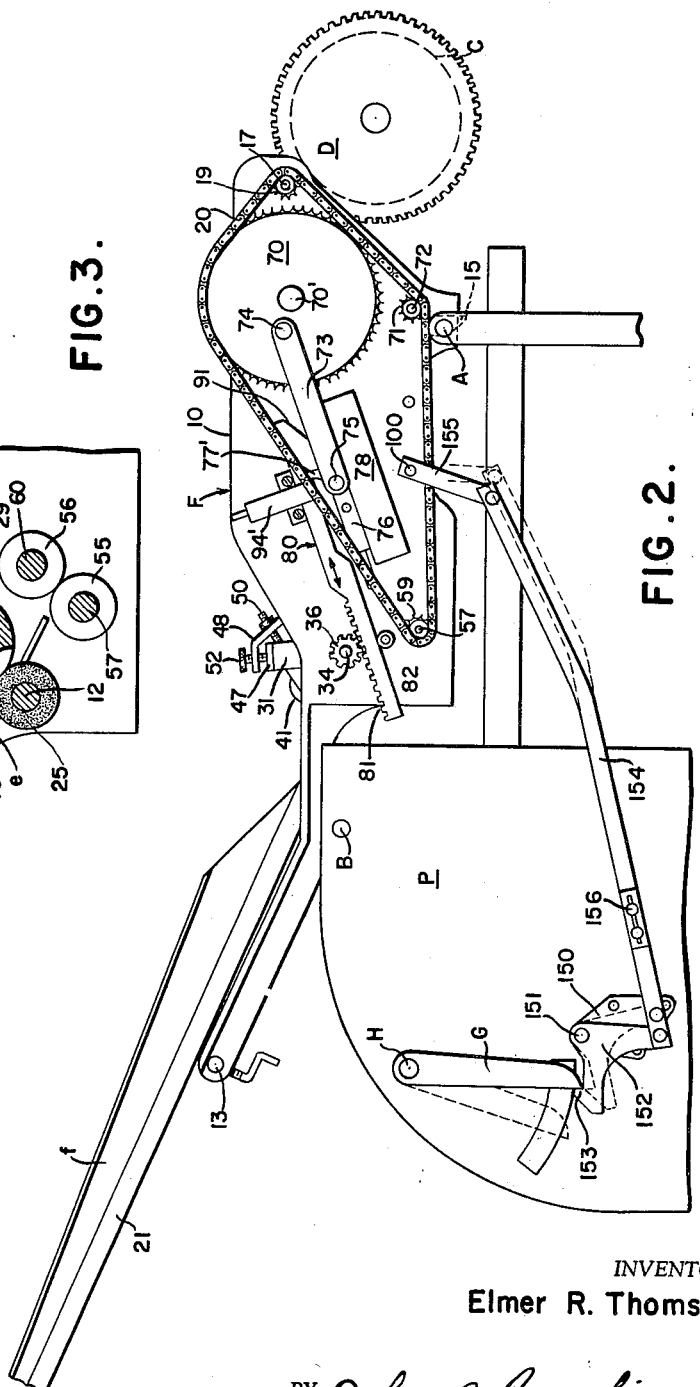
FIGURE 2 is a side elevation of said feeder apparatus in conjunction with fragments of a conventional rotary offset printing duplicator or other press.
FIGURE 3 is a vertical cross-sectional view taken adjacent the feeding or forwarding roll device on the plane of line 3—3 of FIGURE 1.
Figure 13:
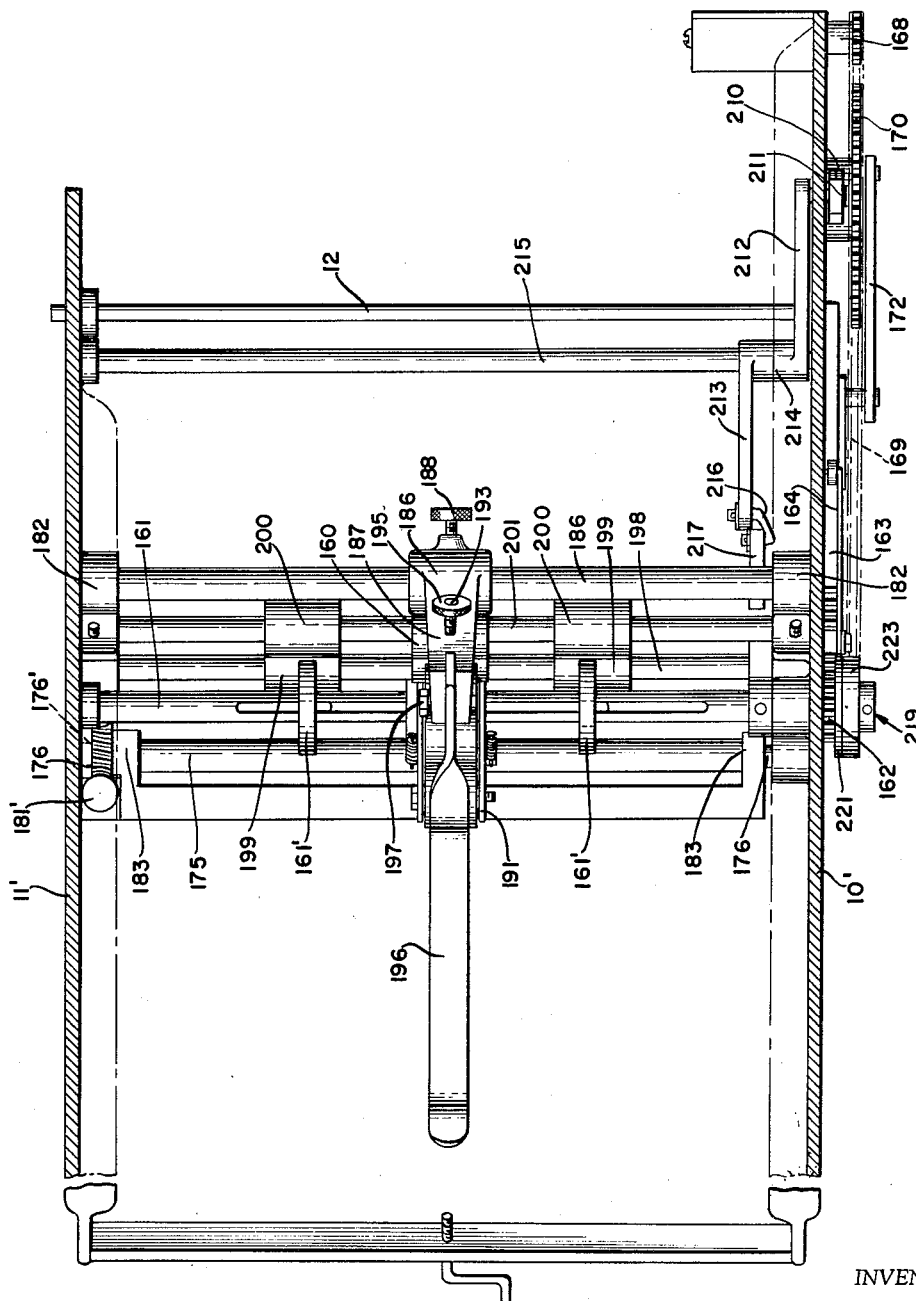
FIGURE 13 is a view of a second or modified form primarily in top plan, but with the side plates partly in section.

The input power to drive feeder apparatus F is obtained from the operating gear O of the blanket cylinder C of said duplicator or press P (FIGURES 1, 2 and 5). Said driving gear D is detachably enmeshed with and drives a pinion gear 16 keyed close to the inner face of the forward portion of side plate 10 on a stub shaft 17 extending through and suitably journalled in that side plate. Fixed on said stub shaft 17 outwardly of said plate 10 is a sprocket wheel 19 over which is trained an endless sprocket chain 20 which imparts the required motion for the various driven parts of the feeder apparatus.

At the stock forwarding or feeder end of the apparatus is a stock feeder mechanism having an angularly disposed bottom plate 21 beneath the forward end of which it carries a bracket 22 having angular ends 23 journalled on rod 12. Said bottom plate 21 is thus pivoted on rod 12 and in rearwardly spaced relation to that rod. Plate 21 rests as at an angle of approximately 25° either on the rod 13 or on a screw 17, threaded through the rod and the adjustment of which suitably varies such angle.

A supply of envelopes is maintained on bottom plate 21 in contact with strip a and flanges g and feed downwardly along the same into the crotch or bight at a separator 25, and a feed or forwarding roll 27. The separator 25 is shown as a stationary cylindrical rough or abradent-surfaced element of Carborundum, stone or like material carried on rod 12 with its axis below and slightly rearward of that of the roll 27. It will be realized that in the travel of the envelopes down the bottom plate 21 that they are fanned out so that each envelope is slightly behind the preceding one, and it is also to be noted that the rotation of said feed roll 27 drags the first envelope forward, while the next envelope is held back through its contact with the Carborundum or other separator 25. Said feed roll 27 is slidably adjustable on a drive-shaft 28 therefor and has a conventional one-way clutch connection therewith at 29. Drive-shaft 28 is journalled in bearings 30 of angle-arms 31 unitarily adjustably turnable with a cross-shaft 32 bridging side plates 10 and 11 and having its ends turnable in bosses or bearings 33 on the inner face of said side plates. Said drive-shaft 28 has a flexible shaft or section 34 in alignment therewith, connected thereto and journalled in a bearing 35 in the side plate 10. Exteriorly of that side plate flexible shaft 34 has a gear or pinion 36 fast thereon.

Said feed roll 27 is at least peripherally of resilient rubber or equivalent friction material. Two generally triangular mounting plates 37, suitably joined together in rigid relation as by fastenings 38 and 39, flank said feed roll. A roll 40 is journalled on fastening 39 to assist in forwarding the envelopes and to start their feed into the other rolls. An intermediate roll 41 is journalled on a shaft 42 having generally rectangular ends 43 vertically slidable in slots 44 of mounting plates 37. Rolls 40 and 41 are at least peripherally of yieldable rubber like roll 27 and they are biased into frictional contact with each other by contractile coil springs 46 appropriately fastened to shaft 42 and plates 37 so that the roll 40 will be driven by an counter-clockwise like feed roll 27. The plates 37 and parts mounted thereby and including roll 27 therebetween are unitarily adjustably slidable along shaft 28.

The inherent flexibility of shaft 34 urges it to horizontal position. Such action of shaft 34 may be supplemented by relatively strong L-shaped spring arms 34' fastened to cross shaft 32 and disposed in contact with the under surface of angle-arms 31. Across the top of angle-arms 31 is a bridge 47 and extending laterally above and across its top is a diagonal arm 48 slidably adjustable along and by means of a screw 49 normally clamped to cross-shaft 32. A bolt shank 50 is pivoted to the plates 37 and is adjustable to tilt such plates 37 to vary the position of roll 40 since the shank passes through an elongated slot in arm 48 and has a nut 51 screw-threaded thereto and in bearing engagement with the arm. To the top of arm 48 a screw 52 is threaded in adjustable bearing contact with bridge 47 to enable adjustment of the position of the feed device as a whole relative to separator 25 and particularly adjustment of feed roll 27 through the downward movement of plates 37 and shaft 28 against the tension of resilient shaft 34. A resilient leaf 53 is fastened at one end to arm 48 with its distal end in frictional contact with the periphery of feed roll 27, the degree of pressure being variable through the adjustment of a contacting screw 54 threaded on the arm 48 and which degree of contact is maintained just sufficient to prevent undesired movement in any direction of that feed roll 27.

As well shown in FIGURE 3, in close proximity to the feed roll 27 and in advance of the bottom plate 21 are lower and upper rubber or other resilient pull-out rolls 55 and 56 for the pieces of stock fed by said forwarding feed roll 27. Rolls 55 are fast on a cross-shaft 57 journalled in bearings on the side plates 10 and 11. Shaft 57 has a sprocket-wheel 59 fast thereon adjacent the outer face of side plate 10 which is geared as hereinafter traced, so as to drive shaft 57 clockwise. Said upper pull-out rolls 56 are fast on a cross-shaft 60 and are in peripheral contact with rolls 55, and thus are frictionally driven counter-clockwise thereby. Shaft 60 (FIGURE 9) is journalled in bearings 61 pivoted at 62 to the adjacent side plates 10 and 11, and the pressure of contact of rolls 56 against rolls 55 is variable through the adjustment of screws 63 threaded to lugs 64 on the bearings 33 and disposed in abutment with expansive coil springs 65 anchored in recesses 66 of said bearings 61.

Note that said bottom plate 21 has a central longitudinal flat strip a both laterally and longitudinally adjustable over the same, being fastened at its upper end by a bolt b passed through the enlarged slots c and d in bottom plate 21 and strip a respectively. Said strip a is resilient with its forward end portion gradually deflected upwardly from bottom plate 21 to direct the envelopes to the feed roll 27, and is suitably cut away at e (FIGURES 1 and 3) for clearance adjacent the separator 25. In addition, longitudinal side members f on the bottom plate 21 make up a trough to facilitate feeding of the stock pieces. Such side members f are angular in cross-section whereby inwardly extending flanges g thereof rest on the bottom plate 21. Also said side members f may be fastened in any transverse position over bottom plate 21 by means of conventional clamp devices h carried by the side member f and associated with the bottom plate in an elongated cross-slot i.

With particular reference to FIGURES 1 and 2, in connection with the actuating mechanism for the forwarding feeder device which centers around the aforesaid feed or forwarding roll 27, endless sprocket chain 20, it will be remembered, is driven by the sprocket-wheel 19 on power input shaft 17 which in turn is driven by power input pinion gear 16 from the driving gear D of the blanket cylinder C of the press P, the chain 20 being trained over a large sprocket-wheel 70 which turns 360° once for each revolution of said blanket cylinder C of the press. Chain 20 is also trained over the previously-mentioned sprocket-wheel 59 on shaft 57 to rotate the pull-out rolls 55 and 56, and is also trained over an idler sprocket-wheel 71 suitably journalled on a fixed shaft 72 adjustably mounted on the outer face of the frame side plate 10.

Said large sprocket-wheel 70 is journalled on a fixed shaft 70' fastened to side plate 10 and has a pitman 73 eccentrically connected thereto at one end by a wrist-pin 74, and said pitman at its other end by means of a wrist-pin 75 is connected to a slide 76 movable along the groove 77 (FIGURE 8) of a track member 78 fastened against the outer face of said side plate 10. Said slide 76 and its track member 78 are preferably inclined downwardly and rearwardly as shown. A feeder device actuating slide bar 80 is disposed above and generally parallel to the slide 76 and at times is adapted to (1) slide; (2) at times have vertical movement, and (3) at other times to remain idle. Such actuating slide bar 80 has rack teeth at 81 enmeshed with the teeth of pinion or gear 36 which rotates flexible shaft 34 and through the same controls the operation of feed roller 27. That portion of slide bar 80 equipped with the rack teeth 81 rests on a guide roller device 82 suitably journalled on a pin 82' on side plate 10.

It will be noted for example in FIGURES 5, 6 and 7 that slide 76 has an upwardly-extending lug or projection 77' thereon which at times is adapted to enter a notch 78' in the under surface of a reduced shank 88 of the slide bar 80, and which shank 88 provides a lower surface designated 89 parallel with the arrangement and path of travel of the slide 76. Said lug 77' at times disengages the notch 78' and enables slide 76 to move longitudinally beneath and relatively to said surface. Also, the forward extremity of the wall of the notch 78' merges into an abutment wall or shoulder 90 of the slide bar 80, which extends below the surface 89.

The forward end of said slide bar 80 is inclined or cam-shaped at 91 in order that the bar may pivot or swing to a limited extent upwardly and downwardly on roller device 82 to engage and disengage the notch 78' and lug 77', through coaction with a cam head 92. At those times when the slide bar 80 must remain stationary, a pin 93' of a suitable spring-biased latch device 94', mounted on the exterior of the side plate 10, is engageable with a depression or notch 95 in its upper edge.

Said cam head 92 is employed as part of the mechanism to insure starting feed of the stock pieces by the roller 20 always at the same time in relation to the operation of the blanket cylinder C of the press. Said cam head is carried by a shaft 93 journalled in bearings 94 of the frame side walls 10 and 11 which is actuated to turn the cam head from and to the lower or retracted position as in FIGURE 5 and the raised or projected position as in FIGURES 6 and 7, such cam head in the different positions abutting a stop pin 95 on the outer face of side wall 10.

The rock-shaft 100 is journalled in and extends through side plate 10 at a bearing 101 thereon (FIGURE 1) and is rigid with a bell crank lever 102 disposed adjacent the inner face of said side plate 10. See FIGURES 5, 6 and 9. Rock-shaft 100 has one arm 103 terminally and constantly biased as at pin 104 against the periphery of a star or combined cam and ratchet wheel 107 (FIGURES 6, 7, 10 and 12) as by a contractile coil-spring 106 fastened to side plate 10 and to a projection 106' on the bell crank lever. Star wheel 107 is mounted and turnable clockwise only, on a stationary pin or shaft 107' fastened to the inner face of side plate 10 and it has four equidistantly spaced similar peripheral lobes 108 alternating with depressions 108' and in its inner side face has eight depressions 109 forming ratchet teeth. A ratchet lever 110 is mounted for rocking on said pin or shaft 107', and carries a spring-loaded pawl 111, which coacts with the teeth 109. Said ratchet lever 110 is rocked clockwise to actuate the star wheel counter to the biasing action of arm 103, at pin 104, the latter successively resting on the ends of lobes 108 and in depressions 108'.

To actuate said ratchet lever 110, slide 76 is provided with a pin 113 which extends through and moves longitudinally in an inclined elongated slot 113' provided through side plate 10 parallel to track member 78. Said pin 113 beyond the inner face of side plate 10 is detachably and pivotally engaged by a hook 114 of a link 115, which is pivoted by a pin 116 to said ratchet lever 110. A link 117 is detachably pivoted at a hook end 117' to a pin 118' on a second arm 118 of bell crank lever 102 and is also pivoted to a crank 119 fastened on cam shaft 93 to operate the cam head 92 to and from its lower position and its raised position through intermittent motions caused by pin 104 following the marginal surface of star wheel 107. When either hook 114 or 117' is detached so cam shaft 93 will not operate, the latter is secured in a stationary position by suitable latch means 92' as in FIGURE 1 so that the same and any part movable therewith cannot accidentally move into interfering relation with operating parts of the apparatus.

Novel mechanism constituting part of the present invention and located primarily adjacent the outer face of side plate 10 as well shown in FIGURE 2, coacts with the sucker or other feed equipment of the conventional press P and such as the previously referred to arm G and shaft H of that equipment. Said arm G swings backward and forward to control the application and release of suction. This novel mechaism comprises an attaching plate 150 suitably secured to a frame part of press P, and has pivotally connected thereto at 151, a hook detent 152 having a shoulder 153 engageable by the arm G. A suitable link 154 is pivoted to hook detent 152 and to a crank 155 fixed on rock-shaft 100.

It is to be understood that the operation is so timed that the hook detent at shoulder 153 will hold or prevent that syinging of arm G to the dotted line or suction controlling position shown in FIGURE 2, and hence cause a skip in operation or restrict operation of the sucker equipment of the conventional press to but once rather than twice during a revolution of blanket cylinder gear D, thus skip one feed actuation during a revolution of blanket cylinder D.

Link 154 is preferably made in sections detachably coupled together at 156 to simplify mounting and removal of feeder F.

*General Operation*

As previously specifically traced with the parts of feeder F duly adjusted, the envelopes, sheets or any appropriate pieces of stock are fed in fanned out fashion down the table 21 with the foremost piece of stock engaging the periphery of the roll 27, and the next piece arrested or separated by the abradent separator element 25, this action occurring intermittently with the feed roll 27 rotating counter-clockwise for each feeding operation and mediately through the input power imparted by the gear D of the blanket cylinder C of the conventional press P, the pieces of stock being moved forward intermittently from the bight between feed roll 27 and the separator 25 into that of the pull-out rolls 55 and 56 and thence onto the tapes or equivalent adjacent parts of the feeding mechanism of the conventional press P. In the travel of the stock to the forwarding feed roll 27, the roller 40 which rotates counter-clockwise therewith first engages the same to assist in the feeding. As pointed out the shaft 28 is turnable or has rocking movement in opposite directions, and the feed roller 27 can only turn clockwise with the shaft 28 in view of the one-way clutch at 29. Shaft 28, because it is aligned with shaft 34 which is equipped with the pinion 36, is actuated by the rack teeth 81 of slide bar 80. Rotation of the large sprocket-wheel 70, through a link 73, moves the slide 76 back and forth. The lug 77' on that slide is movable into the notch 78' of the rack bar 80 to move the latter back and forth with the slide to turn the gear or pinion 36 clockwise on the backward movement, and through the flexible shaft 34 and shaft 28 to turn the feed roll 27 only clockwise as pointed out, shaft 28 being able to turn counter-clockwise relative to gear 27 through provision of the clutch 29. Said large sprocket-wheel 70 turns 360° once for each revolution of the blanket cylinder C of the press P, and therefore a piece of stock is fed for each revolution of that cylinder.

The cam 92 and its operation assures the starting of the piece of stock into the bight between the feed roll 27 and the separator 26 at the same time in relation to the rotation of said blanket cylinder C. In the retracted or lower position of the cam 92 as in FIGURE 5, the rack bar 80 slides rectilinearly, that is, without vertical pivotal movement of that rack bar on roller 82, and since the slide 76 and rack bar are engaged at the stud 77' and notch 78', one piece of stock is fed at each stroke of that rack bar. However, when the cam head 92 is in the projected or vertical position of FIGURE 7 the bevel end 91 of the rack bar strikes the cam which causes pivotal raising of the rack bar from the roller 82 as an axis. Cam head 92 in the last position, then holds the rack bar 80 disengaged with slide 76 to dwell for a period out of operation. Said cam head 92 is turned to the retracted and projected positions by the shaft 93 under control of the bell crank lever 102 and its connection with that shaft through link 117 and crank 119. Since the slidable rack bar 80 cannot disengage the slide 76 except in the most forward position, the feed roll 27 starts feeding and stops feeding always in the same position in relation to the rotation of blanket cylinder C. It should be mentioned also that when slide or rack bar 80 is in its most forward position as in FIGURE 6, the latch pin 93' moves into the recess 95' in order to hold the rack bar on the peripheral end of the adjacent lobe of cam head 92 until that cam head is again retracted.

Although the improved feeder apparatus F may be used in lieu of the feeder mechanism of the conventional press P, thus feeding the stock into the conventional press instead of that mechanism, the instant feeder apparatus may be used to alternately feed the stock into that press. Thus a piece of stock may be fed from the instant feeder apparatus F, and the next piece of stock fed from the feeder of the conventional press P, both feed operations occurring during one revolution of the blanket cylinder C. In the latter instance, the feeder mechanism of the press P is caused to feed but one piece of stock rather than at intervals feed two pieces of stock during each revolution of the blanket cylinder C. To skip one of said feed operations of the feeder of the conventional press P, the pin 113 as it travels back and forth in the slot 113', through engaged link 115 actuates ratchet lever 110 so that the pawl 111 and the ratchet teeth 109 turn the star wheel 107 clockwise one-eighth of a turn. As such star wheel 107 turns, spring 106 causes such movement of the bell crank lever 102 that the pin 104 rides from the peripheral end of the engaged lobe 108 into the adjacent depression 108'. Such forward swing of the bell crank lever 102, through the shank 88 of the slide bar 80 and crank 119, rocks the shaft 93 and cam head 92 to the proper position to cause the skip feed.

In connection with the skip feed, note that the hook lever 152 occupies the full-line position shown in FIGURE 2, where the shoulder 153 of that lever has been moved into the path of arm G and prevents its swinging back to effect a suction or feed actuation of the feeder mechanism of the conventional press P. It will be realized that the purpose of the alternate feeding by the press P and by the instant invention is to enable printing of the stock pieces in different colors with collation of said pieces at the time of printing.

Various changes may be resorted to within the spirit and scope of the invention. For example and as shown in the modified form of FIGURES 13 to 22 I may provide means to insure firmer gripping of the sheet by the pull-out rolls as by thrusting the sheet between such rolls while separated and by delaying the pull-out action until the feed roll has reached its limit of forwarding motion; and may provide a more minute and accurate adjustment for the stone or other separator.

The construction and operation now being considered is to be taken as that hereinbefore disclosed with respect to FIGURES 1 to 12, unless otherwise pointed out. A feed roll 160 corresponding to that at 27 is mounted for one-way or counterclockwise drive on a transverse shaft 161 journalled on side plates 10' and 11' which correspond to those at 10 and 16. Shaft 161 replaces the partly resilient and sectional shaft 28-34. A gear 162 which is the equivalent of gear 36 is journalled on said shaft 161, and is driven in one direction through the reciprocation of a slide-bar 163 mounted and functioning as shown and described with respect to the actuating slide bar 80, on the first form.

A latch 164 may replace and function like latch 93' of the first form, being a spring or wire arm anchored at 165 to the side plate 10' tensioned to urge a roller 166 theeron against slide bar 163 to appropriately coact with a notch 167 like notch 95.

The input power to actuate slide bar 163 is obtained through the same mechanism employed in the first form of the invention, that is generally, from the blank cylinder C through the medium of shaft 168, chain 169, large sprocket 170, its shaft 171 which is here rigid therewith, pitman 172 and slide 173.

A separator stone or the like 174 functions like that at 25 but in this form of the invention it is adjustable toward or away from the feed roll. This stone is fixed on an arbor or shaft 175 and has ends 176 which are eccentric and journalled in bosses 177 on side walls 10' and 11'. Said separator 175 coacts with the periphery of feed roll 160 similarly to the coaction of separator 25 and feed roll 27 in the first form. On said arbor or shaft 175 a worm-gear wheel 176 is keyed and enmeshed therewith is a vertically disposed worm 177. Said worm is carried by a vertical shaft 178 which is journalled in a bracket 179 fastened against the inner surface of side plate 11'. Said vertical shaft 178 (see FIG. 17) is journalled in the bracket 179, extends above it and has shoulders as at 180 and 181, engaging the bracket 179 or adjacent part to prevent vertical displacement. At the top, shaft 178 is provided with a knurled operating knob 181.

A bracket 182 for the most part parallel with and spaced from shaft 175 is fastened to the latter at angle ends 183. Said separator 174 is slidably adjustable along the shaft 175 to accommodate different sized or shaped pieces of work, and it is adapted to be fastened to the shaft in any of its adjusted positions by a binding screw 184 optionally positioned in any of a series of screw-threaded openings 185 in the bracket (FIGS. 18 and 19).

A cross-shaft 186 replaces shaft 32 and is fixed in bosses 182 on side plates 10' and 11'. On shaft 186 an arm 187 which generally extends upwardly and rearwardly, is slidably and rockably mounted for adjustment and rigid fastening as by a binding screw 188. Arm 187 is employed to adjustably suspend and regulate the position of rolls 189 and 190 (FIG. 16) which function like rolls 40 and 41 of the first form to assist in forwarding the envelopes or sheets. As in the first form, said rolls are suitably adjustably mounted by a generally triangular mounting plate structure 191 replacing the plates 59 and associated parts of the first form, and which plate or mounting structure 191 is journalled on the drive-shaft 161. Pivoted to the structure 191 as at 192 is a bolt 193 which passes through an enlarged slot 194 of arm 187, and on opposite sides of which arm, nuts 195 are adjustably threaded to the bolt 193 to enable swinging of the plate structure 191 on the axis of shift 161 or permit that plate structure to drop, and thereby the position of the rolls 189 and 190 to be varied and regulated. To the top of arm 187 (FIGS. 13 and 17) a suitably weighted hold-down arm 196, for the supply of envelopes or sheets being fed, is connected by a pivot or bolt 197.

On shaft 161 are slidably adjustable guides 161' for the stock of envelopes or sheets.

A transverse arbor or shaft 198, driven by chain 169, is mounted in bosses on the side plates 10' and 11' and on said shaft forwarding or pull-out rolls 199, of rubber or any equivalent, are disposed. Above said rolls 199 are rolls 200, the rolls 199 and 200 coacting to pull out or forward the envelopes or sheets generally like the aforesaid rolls 55 and 56. In the present form, said forwarding or pull-out rolls 200 are journalled on or rotate with a mounting shaft 201, which is preferably journalled in cranks 202 adjacent opposite ends of a tubular shaft 203 on which said cranks are rigid. Tubular shaft 203 is pivotally or rockably mounted on a fixed shaft 204 whose ends are fixed in bosses on the side plates 10' and 11'. In view of this mounting, the rolls 200 at approved times may swing on the axis of shaft 204 into or away from contact with the roll 199. An expansive coil spring 205 is seated about pins 206 and 207 which project into the same from bosses 182 and projections on cranks 202.

In this form of the invention (see FIGS. 15 and 16), the forwarding or pull-out rolls 199 and 200 are appropriately separated to receive the fed envelope or sheet between the same and are closed and thus grip the envelope or sheet after feed roll 160 has reached its limit of feeding or forwarding motion. To effect this action, and with particular reference to FIG. 15, the stub-shaft 171 rigid with the large sprocket-wheel 170 is journalled in the side plate 10', and carries a cam 208 rigid thereon disposed relatively close to the latter side plate. Cam 208 has a lobe 209, adapted to raise or lower a roller or projection 210, which follows the periphery of cam 208 and which is journalled on a pin 211 extending from the free end of a crank 212 forming part of a rocker completed by a crank 213, the cranks being joined together by a sleeve 214 pivoted on a shaft 215 rigidly fastened at its ends to the side plates 10' and 11'. A depending link 216 is pivoted both to side crank 213 and to a crank 217 rigidly fastened on the tubular shaft 218.

Reverting to the one-way intermittent drive of gear 162, the drive-shaft 161 and its feed roll 160 so that the latter feed roll will perform the same function as feed roll 27 in the first form of the invention, an appropriate one-way clutch 219 is carried by shaft 161 in coacting relation to gear 162. See FIGS. 20, 21 and 22. Gear 162 specifically, is journalled on a reduced portion 220 of said shaft 161, and a round disk or plate 221 forming part of the clutch 219 is strung on said reduced portion 220 and is rigid with the gear 162 due to the extension of pins 222 on the gear extending through and beyond the plate into the interior of the clutch. A hollow cover section of said clutch is shown at 223 and between said cover section 223 and plate 221 one or more clutch dogs 224 are housed, being pivoted on said pins 222. Said dogs 224 are of a length permitting them to rotate in one direction with the gear independently of or without clutching the cover section 223 while rotation of said plate in the other direction will cause the dogs to bind or clutch against the inner surface of a peripheral flange 225 of said cover section. Expansive coil spring devices 226, fastened to the plate 221, bear against the dogs 222 and urge them into contact with said inner surface of flange 225.

*Operation of Form of FIGS. 13 to 22*

Presuming operation of the modified form disclosed in FIGS. 13 to 22, the input power is derived from the blanket cylinder C as in the first form, which, stated generally, drives shaft 168 and in turn sprocket chain 169 and associated parts including the large sprocket wheel 170 and its shaft 171. Through the connections detailed in the first form, shaft 171 operates the pitman 172, the slide 173 and the actuating slide bar 163 which drives the gear 162 and comparable to the drive of the first form at parts 80 and 36.

Said drive of shaft 161 is in one direction only due to the fact that rotation of gear 162 and plate 221 will throw the dogs 224 into end contact with the inner surface of cover section 223 of the clutch fastened rigidly on shaft portion 220 as by a screw 223'. Reciprocation of said slide 163 in the opposite direction will not drive said shaft 161 but will simply loosely turn the gear 162 and plate 221 on reduced portion 220 since the dogs 224 are of a shape to slip with respect to said inner surface.

The bight between the spreader 174 and feed roll 160 is adjustable and variable through the manual control of shaft 178 and the eccentric mounting and worm drive of shaft or arbor 175.

The envelope or sheet stock which is suggested at a' in FIGS. 16 and 15 and corresponds to the envelope or sheet stock A, is fed into the said bight between the spreader 174 and the feed roll 160, and thence between the forwarding or pull-out rolls 199 and 200 while they are spaced apart as shown in dotted lines in FIG. 15. Operation of the parts is timed so that at the moment the envelope or sheet a' passes the said bight, the forwarding or pull-out rolls 199 and 200 move toward each other and grip the sheet and advance it. Except while actually feeding a sheet a', the roll 200 is spaced from the roll 199 as shown in dotted lines in FIG. 15, being so held by the crank arms 202, shaft 203, and the hereinbefore described parts, and with roll 210 riding the marginal surface of the cam 208 so that through the associated parts roll 200 moves toward the roll 199 when the roll 210 is shifted by the cam lobe 209, the contact or pressure between rolls 199 and 200 being yieldable in view of the bias of spring 205.

Various changes may be resorted to within the spirit and scope of the invention.

What is claimed is:

1. A sheet feeding apparatus having an actuating shaft mounted for limited rotation in opposite directions, a sheet feeding roll journalled thereon adapted to remain stationary relatively thereto during rotation of the shaft in the first of said directions, mechanism to impart said limited rotation in the opposite direction to said shaft, and means to cause said roll to rotate with the shaft in the second of said directions.

2. A sheet feeding apparatus having an actuating shaft mounted for limited rotation in opposite directions, mechanism to impart said limited rotation to the shaft, a sheet feeding roll through which the shaft passes and relatively to which it rotates in the first of said directions, and means to cause said feed roll to rotate with said shaft in the second of said directions.

3. A sheet feeding apparatus having an actuating shaft mounted for limited rotation in opposite directions, mechanism to impart said limited rotation to the shaft, a sheet feeding roll through which the shaft passes and relatively to which it rotates in the first of said directions, and clutch means between the shaft and feed roll to cause said feed roll to rotate with said shaft in the second of said directions.

4. A sheet feeding apparatus having a sheet feeding roll, an actuating shaft therefor including a resilient portion, a mounting for said shaft having support from said portion, and means to variably position said mounting counter to the resilient action of said portion to adjust the operative position of said feeding roll.

5. A sheet feeding apparatus having a sheet feeding roll, an actuating means carrying said roll, a fixed support and a resilient support for said roll, a mounting structure for said actuating means turnable for adjustment on said fixed support, and means mounted on said fixed support operable to adjust the mounting structure counter to the action of the resilient support to vary the position of said feeding roll.

6. A sheet feeding apparatus having a feeding roll, an actuating shaft therefor, a mounting structure on which said shaft is journalled including a resilient portion in supporting relation to said structure, a fixed support on which said structure is adjustably turnable, a sheet separator coacting with said roll, and means mounted by said fixed support operable counter to the tension of said portion to vary the position of the feed roll relative to said separator.

7. A sheet feeding apparatus having a feeding roll, an actuating shaft therefor, a mounting structure on which said shaft is journalled including a resilient portion in supporting relation to said structure, a fixed support on which said structure is adjustably turnable, a sheet separator coacting with said roll, means mounted by said fixed support operable counter to the tension of said portion to vary the position of the feed roll relative to said separator, and a roll carried by said structure operable from the feed roll engageable with a sheet to assist its advance to the feed roll.

8. A sheet feeding apparatus having a feeding roll, an actuating shaft therefor, a mounting structure on which said shaft is journalled including a resilient portion in supporting reaction to said structure, a fixed support on which said structure is adjustably turnable, a sheet separator coacting with said roll, and a bracket mounted by said fixed support, screw means on said bracket operable counter to the tension of said portion to vary the position of the feed roll relative to said separator.

9. A sheet feeding apparatus having a feeding roll, an actuating shaft therefor, a mounting structure on which said shaft is journalled including a resilient portion in supporting relation to said structure, a fixed support on which said structure is adjustably turnable, a sheet separator coacting with said roll, a bracket mounted by said fixed support, screw means on said bracket operable counter to the tension of said portion to vary the position of the feed roll relative to said separator, a device mounted on said shaft carrying a roll engageable with a sheet to assist its advance to the feed roll, and means on said arm to variably position said device.

10. A sheet feeding apparatus having a feeding roll, an actuating shaft therefor, a mounting structure on which said shaft is journalled including a resilient portion in supporting relation to said structure, a fixed support on which said structure is adjustably turnable, a sheet separator coacting with said roll, a bracket mounted by said fixed support, screw means on said bracket operable counter to the tension of said portion to vary the position of the feed roll relative to said separator, a device mounted on said shaft carrying a roll engageable with a sheet to assist its advance to the feed roll, means on said arm to variably position said device, and means carried by said arm contacting the periphery of the feed roll to maintain it in operative position.

11. A sheet feeding apparatus having a feeding roll, an actuating shaft therefor, a mounting structure on which said shaft is journalled including a resilient portion in supporting relation to said structure, a fixed support on which said structure is adjustably turnable, a sheet separator coacting with said roll, a bracket mounted by said fixed support, screw means on said bracket operable counter to the tension of said portion to vary the position of the feed roll relative to said separator, a device mounted on said shaft carrying a roll engageable with a sheet to assist its advance to the feed roll, means on said arm to variably position said device, means carried by said arm contacting the periphery of the feed roll to maintain it in operative position, drive mechanism for said actuating shaft, and sheet pull-out rolls in advance of said feed roll actuated by said drive mechanism.

12. A sheet feeding apparatus having sheet feeder means, a reciprocable power input slide, an actuating slide geared to said feeder means, interengaging means between said slides to cause said actuating slide to be reciprocated with said input slide, and means interposable into the path of movement of said actuating slide to move it laterally with respect to the input slide to disengage said interengaging means and support said actuating slide in disengaged position to permit independent movement of the input slide relatively thereto.

13. A sheet feeding apparatus having sheet feeder means, a reciprocable power input slide, an actuating slide geared to said feeder means, interengaging means between said slides to cause said actuating slide to be reciprocated with said input slide, and means interposable into the path of movement of said actuating slide to move it laterally with respect to the input slide to disengage said interengaging means and support said actuating slide in disengaged position to permit independent movement of the input slide relatively thereto, and means to releasably hold said actuating slide against movement when supported in disengaged position.

14. A sheet feeding apparatus having sheet feeder means, a reciprocable power input slide, an actuating slide geared to said feeder means, interengaging means between said slides to cause said actuating slide to be reciprocated with said input slide, said actuating slide having a cam surface, and means interposable into the path of movement of and engageable by said cam surface to move said actuating slide laterally with respect to the input slide to disengage said interengaging means and support said actuating slide in disengaged position to permit independent movement of the input slide relatively thereto.

15. A sheet feeding apparatus having sheet feeder means, a reciprocable power input slide, an actuating slide geared to said feeder means, interengaging means between said slides to cause said actuating slide to be reciprocated with said input slide, a device operable to engage and disengage said interengaging means, and actuating mechanism connected to said device and to one of said slides to control the movement of said device.

16. A sheet feeding apparatus having sheet feeder means, a reciprocable power input slide, an actuating slide geared to said feeder means, interengaging means between said slides to cause said actuating slide to be reciprocated with said input slide, cam means operable to engage and disengage said slides, actuating parts connected to said cam means, and mechanism connected to said parts and to one of said slides to control the movement of said cam means.

17. A sheet feeding apparatus having sheet feeder means, a reciprocable power input slide, an actuating slide geared to said feeder means, interengaging means between said slides to cause said actuating slide to be reciprocated with said input slide, cam means operable to engage and disengage said interengaging means, actuating parts connected to said cam means, an actuating member for said parts having a rocking movement, and mechanism connected to said parts and detachably connected to one of said slides to control the movement of said cam means.

18. A sheet feeding apparatus having intermittently operable sheet feeder means, a power input slide, a rotatable driving means, chain and sprocket means driven thereby to reciprocate said slide, an actuating slide geared to said feeder means, interengaging means between said slides to cause said actuating slide to be reciprocated with said input slide, and means operable to engage and disengage said slides.

19. A sheet feeding apparatus according to claim 18 including sheet pull-out rolls associated with the sheet feeder means driven by said chain and sprocket means.

20. A sheet feeder apparatus having sheet feeder means provided with an operating part movable in opposite directions, a power input member, an actuating slide member having a rack enmeshed with said operating part, interengaging means between said members to cause said actuating slide member to be reciprocated by said power input member, and means operable to engage and disengage said members.

21. A sheet feeder apparatus according to claim 20 wherein said actuating slide member has a pivotal movement to engage and disengage the power input member and a support on which said actuating slide member pivots maintaining the rack enmeshed with said operating part.

22. A sheet feeder apparatus having sheet feeder means provided with an operating part movable in opposite directions, a power input member, an actuating slide member intergeared with said operating part, interengaging means between said members to cause said actuating slide member to be reciprocated by said power input member, means operable to impart a pivotal movement to said actuating slide member to engage and disengage said members and support said actuating slide member in disengaged position, and latch means operable in said disengaged position to hold the actuating slide member against movement with said power input member.

23. A sheet feeder apparatus according to claim 22 wherein said interengaging means comprises a projection on one of the members and a notch in the other member, said notch being in the lower surface of the actuating slide member, and said actuating slide member having a portion disposed below said notch to enable support against pivotal movement by the last-mentioned means while latched.

24. A sheet feeder apparatus having sheet feeder means provided with an operating part movable in opposite directions, a power input member, an actuating slide member intergeared with said operating part, interengaging means between said members to cause said actuating slide member to be reciprocated by said power input member, means operable to impart a pivotal movement to said actuating slide member to engage and disengage said members and support said actuating slide member in disengaged position, latch means operable in said disengaged position to hold the actuating slide member against movement with said power input member, chain and sprocket mechanism, a power input drive for said chain and sprocket mechanism, the latter mechanism including a sprocket-wheel, and a pitman connection between said sprocket wheel and said power input member.

25. A sheet feeder apparatus having sheet feeder means provided with an operating part movable in opposite directions, a power input member, an actuating slide member intergeared with said operating part, interengaging means between said members to cause said actuating slide member to be reciprocated by said power input member, means operable to impart a pivotal movement to said actuating slide member to engage and disengage said members and support said actuating slide member in disengaged position, latch means operable in said disengaged position to hold the actuating slide member against movement with said power input member, chain and sprocket mechanism, a power input drive for said chain and sprocket mechanism, the latter mechanism including a sprocket-wheel, a pitman connection between said sprocket-wheel and said power input member, said slide members being inclined, track means for said power input slide member, and means operable by said power input member to prevent alternate sheet feeding operations of a press.

26. A sheet feeding apparatus according to claim 1 having pull-out rolls associated with said sheet feeding roll, and said mechanism including parts effecting separation and closing of said pull-out rolls to respectively receive and forward a sheet.

27. A sheet feeding apparatus according to claim 1 having pull-out rolls enmeshed with said sheet feed roll, and said mechanism includes parts effecting separation of said feed rolls to receive a sheet before the limit of feeding motion of said feed rolls, and closing of said pull-out rolls on the sheet at the said limit.

28. A sheet feeding apparatus according to claim 18 including coacting sheet pull-out rolls associated with the sheet feeder means driven by said chain and sprocket means and including a mounting for one of the latter rolls, and rocker and cam means to rock said mounting to open and close the pull-out rolls.

29. A sheet feeding apparatus according to claim 18 including coacting sheet pull-out rolls associated with the sheet feeder means driven by said chain and sprocket means and including a shaft having crank arms carrying one of said pull-out rolls, a crank member on said shaft, the axis of said shaft being located between said crank arms and crank member, and parts connected to said crank member including a rocker, and cam means driven from said sprocket coacting with said rocker so that the latter will effect opening and closing of the pull-out rolls.

30. A sheet feeding apparatus according to claim 18 including coacting sheet pull-out rolls associated with the sheet feeder means driven by said chain and sprocket means and including a shaft having crank arms carrying one of said pull-out rolls, a crank member on said shaft, the axis of said shaft being located between said crank arms and crank member, and parts connected to said crank member including a rocker, and cam means driven from said sprocket coacting with said rocker so that the latter will effect opening and closing of the pull-out rolls.

31. A sheet feeding apparatus according to claim 30 having a device biasing the pull-out rolls to swing one toward the other.

32. A sheet feeder apparatus having a sheet feeding roll and separator forming a bight therewith for feeding sheets, and means operable to adjustably position said separator peripherally relatively to the feed roll.

33. A sheet feeding apparatus according to claim 18 including coacting sheet pull-out rolls associated with the sheet feeder means driven by said chain and sprocket means and including a shaft having crank arms carrying one of said pull-out rolls, a crank member on said shaft, the axis of said shaft being located between said crank arms and crank member, and parts connected to said crank member including a rocker, and cam means driven from said sprocket coacting with said rocker so that the latter will effect opening and closing of the pull-out rolls, a sheet feeder means, a separator forming a bight therewith for feeding sheets, means operable to adjustably position said separator peripherally relatively to the sheet feeder means including a shaft mounting said separator, means eccentrically mounting said shaft, an operating member, and adjustable intermeshing worm gearing between said operating member and said shaft.

34. A sheet feeder apparatus having intermittently operable sheet feeder means, a reciprocating rack bar to operate said sheet feeder means, actuating means for said reciprocating rack bar including a reciprocating slide, a pitman connected to the reciprocating slide, a sprocket connected to said pitman, cooperating abutment means on said rack bar and slide for interengaging said rack bar and slide, cam means for disengaging said abutment means, a control wheel providing a star surface, means biasing said slide against said surface, and pawl and ratchet means to intermittently advance said wheel.

35. A sheet feeder apparatus having intermittently operable sheet feeder means, reciprocating means to operate said sheet feeder means, actuating means for said reciprocating means including a rockable actuating member, a control wheel providing a star surface, means biasing said actuating member against said surface, and pawl and ratchet means to intermittently advance said wheel, said reciprocating means having a part disengageable at one of its connections, to prevent operation of the rockable member.

36. A sheet feeder apparatus having intermittently operable sheet feeder means, reciprocating means to operate said sheet feeder means, actuating means for said reciprocating means including a rockable actuating member, a control wheel providing a star surface, means biasing said actuating member against said surface, and pawl and ratchet means to intermittently advance said wheel, a side plate on opposite faces of which said reciprocating means and rockable actuating member are disposed, said side plate having an elongated slot therethrough, said reciprocating means including operative linkage through said slot with said rockable actuating member.

37. A sheet feeder apparatus according to claim 36 having a pin reciprocable in said slot and a part pivoted on and disengageable from said pin.

References Cited in the file of this patent

UNITED STATES PATENTS

| | | |
|---|---|---|
| 2,089,936 | Davidson | Aug. 17, 1937 |
| 2,705,143 | Greenwood | Mar. 29, 1955 |